(12) United States Patent
Choi

(10) Patent No.: US 8,384,839 B2
(45) Date of Patent: Feb. 26, 2013

(54) LIQUID CRYSTAL DISPLAY DEVICE

(75) Inventor: Heeryoul Choi, Seoul (KR)

(73) Assignee: LG Display Co., Ltd, Seoul (KR)

( * ) Notice: Subject to any disclaimer, the term of this patent is extended or adjusted under 35 U.S.C. 154(b) by 413 days.

(21) Appl. No.: 12/314,369

(22) Filed: Dec. 9, 2008

(65) Prior Publication Data

US 2009/0237583 A1     Sep. 24, 2009

(30) Foreign Application Priority Data

Mar. 21, 2008   (KR) .................. 10-2008-0026563

(51) Int. Cl.
  *G02F 1/1333*     (2006.01)
(52) U.S. Cl. ............... 349/58; 362/632; 362/633
(58) Field of Classification Search ............ 349/58; 362/632–634
  See application file for complete search history.

(56) References Cited

U.S. PATENT DOCUMENTS

| | | | |
|---|---|---|---|
| 6,573,956 B1 * | 6/2003 | Shibata | 349/65 |
| 2003/0071941 A1 | 4/2003 | Mizuno | |
| 2005/0057703 A1 * | 3/2005 | Tsubokura et al. | 349/58 |
| 2006/0291242 A1 * | 12/2006 | Ko | 362/607 |
| 2007/0030439 A1 * | 2/2007 | Kinoshita et al. | 349/158 |

FOREIGN PATENT DOCUMENTS

| | | |
|---|---|---|
| CN | 1412781 | 4/2003 |
| JP | 2001091945 A | 4/2001 |
| JP | 2004046115 A | 2/2004 |
| KR | 1020050032848 A | 4/2005 |
| KR | 1020070042634 A | 4/2007 |
| TW | 200617510 A | 6/2004 |
| TW | 200625221 A | 7/2005 |
| TW | 200617510 A * | 6/2006 |

* cited by examiner

*Primary Examiner* — Nathanael R Briggs
(74) *Attorney, Agent, or Firm* — Morgan, Lewis & Bockius LLP

(57) ABSTRACT

An embodiment of this document relates to a liquid crystal display device. A liquid crystal display device in accordance with an aspect of this document may comprise a mold frame; a liquid crystal panel supported by the mold frame and having a display area and non-display area; a polarizer film disposed at least one surface of the liquid crystal panel; a light source substrate supported by the mold frame and having a light source; a light guide plate deliver the light produced by the light source to the liquid crystal panel; a plurality of optical sheets disposed on the light guide plate; a black frame disposed between the optical sheets and the liquid crystal panel and having an exposal area corresponding to the display area of the liquid crystal panel; and a dummy film disposed between the liquid crystal panel and the black frame.

8 Claims, 4 Drawing Sheets

LIQUID CRYSTAL DISPLAY DEVICE

This application claims the benefit of Korean Patent Application No. 10-2008-0026563 filed on Mar. 21, 2008, which is hereby incorporated by reference.

BACKGROUND OF THE INVENTION

1. Field of the Invention

This document relates to a liquid crystal display device.

2. Description of the Related Art

The liquid crystal display device is classified as a light-receiving type display device. It can display images upon receiving a light from a backlight unit disposed under a liquid crystal panel.

A backlight unit may comprise a light source, a light source substrate, a light guide plate, a plurality of optical sheets, etc. And the liquid crystal panel may comprise a polorizer film disposed at a display area of the liquid crystal panel, a driver disposed at a non-display area of the liquid crystal panel, a circuit board unit supplying a driving signal and etc.

In case of a small sized module, it has a black frame of one-side or two-side adhesive. The black frame is to prevent a light produced by the backlight unit from emitting to outside of the display area and emitting to inside of the backlight unit. The black frame is attached to one side of light source substrate to prevent a plurality of optical sheets and etc., from moving in the mold frame.

But, there is a space between the liquid crystal panel and the black frame because of the polarizer film disposed other side of the liquid crystal panel and a plurality of the optical sheets. The adhesive strength of the black frame is lowered under high temperature or humidity circumstance. It makes the black frame to be come off it self and the light source substrate and a plurality of the optical sheets to be come off. In this case, it is impossible for the black frame to shield the light, there by cause of a hot spot on the liquid crystal panel. Thus, in order to improve the display quality of the LCD, the research on the field needs to be continued.

SUMMARY OF THE INVENTION

A liquid crystal display device in accordance with an aspect of this document may comprise a mold frame; a liquid crystal panel supported by the mold frame and having a display area and non-display area; a polorizer film disposed at least one surface of the liquid crystal panel; a light source substrate supported by the mold frame and having a light source; a light guide plate delivering light produced by the light source to the liquid crystal panel; a plurality of optical sheets disposed on the light guide plate; a black frame disposed between the optical sheets and the liquid crystal panel and having an exposal area corresponding to the display area of the liquid crystal panel; and a dummy film disposed between the liquid crystal panel and the black frame.

A liquid crystal display device in accordance with an other aspect of this document may comprise a mold frame; a liquid crystal panel supported by the mold frame and having a display area and non-display area; a light source substrate supported by the mold frame and having a light source; and a black frame disposed between the light source substrate and the liquid crystal panel, and having an exposal area corresponding to the display area of the liquid crystal panel, wherein the black frame having a first thickness part corresponding to the non-display area of the liquid crystal panel and a second thickness part corresponding to the display area of the liquid crystal panel, and wherein the first thickness part is thicker than the second thickness part.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF PREFERRED EMBODIMENTS

Reference will now be made in detail embodiments of the invention examples of which are illustrated in the accompanying drawings.

The detailed exemplary embodiments of the present invention will now be described with reference to the accompanying drawings.

<First Embodiment>

Figure 1:
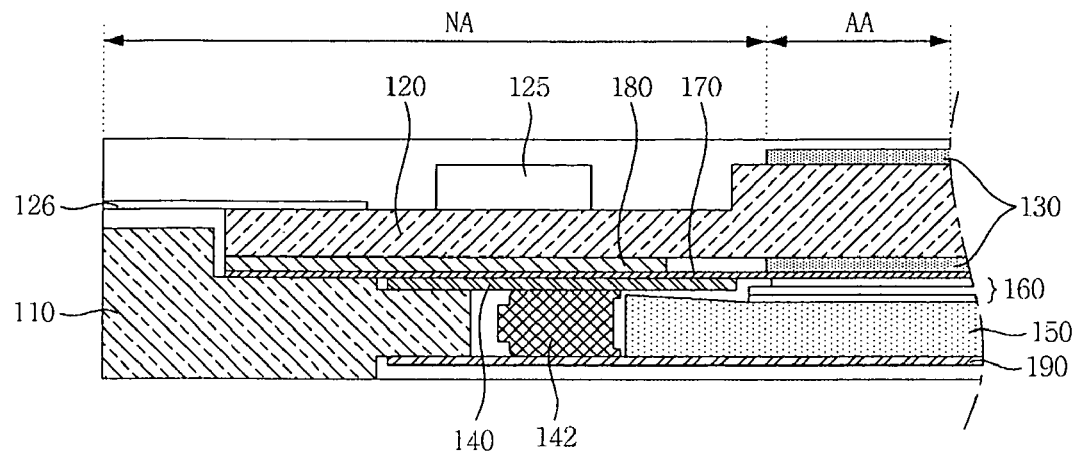
FIG. 1 is sectional views showing a part of a liquid crystal display device in accordance with a first embodiment of this document.

As shown in FIG. 1, a liquid crystal display device according to a first exemplary embodiment of this document may comprise a mold frame 110, a liquid crystal panel 120 supported by the mold frame 110 and having a display area AA and non-display area NA, a polorizer film 130 disposed at least one surface of the liquid crystal panel 120, a light source substrate 140 supported by the mold frame 110 and having a light source 142, a light guide plate 150 delivering light produced by the light source 142 to the liquid crystal panel 120, a plurality of optical sheets 160 disposed on the light guide plate 150, a reflection sheet 190 disposed under the light guide plate 150, a black frame 170 disposed between the optical sheets 160 and the liquid crystal panel 120 and having an exposal area corresponding to the display area AA of the liquid crystal panel 120, a dummy film 180 disposed between the liquid crystal panel 120 and the black frame 170, and a reflection sheet 190 disposed under the light guide plate 150.

The mold frame 110 comprises steps to support each the liquid crystal panel 120 and the light source substrate 140. The mold frame 110 has an open area corresponding to the display area AA of the liquid crystal panel 120 so that a user may watch an image on the liquid crystal panel 120.

The liquid crystal panel 120 may comprises a driving unit 125 disposed in the non-display area NA and a circuit substrate 126 separated from the driving unit 125 and supplying a driving signal from an external substrate to the liquid crystal panel 120. The liquid crystal panel 120 includes an upper plate, lower plate on which color filters, thin film transistors (TFTs) and liquid crystal cells between the upper plate and lower plate. In order to control a light transmittance and display an image, sub-pixels in the liquid crystal panel 120 are arranged in a matrix form and independently driven by the TFTs, and liquid crystal alignment is controlled by a difference voltage between a common voltage supplied to common electrodes and a data signal supplied to pixel electrodes via the TFTs in the respective sub-pixels.

In a view of a driving method of the liquid crystal panel 120, the liquid crystal panel 120 may display an image because an alignment of liquid crystal is changed according to scan signals supplied through the gate lines and data voltages supplied through the data lines.

Here, the scan signal may be a pulse signal consisting of a gate high voltage and a gate low voltage which are alternative each other. The gate high voltage is supplied during one horizontal time period and the gate low voltage is supplied during the other horizontal time period. When the gate high voltages are supplied from the gate lines, the TFTs included in the pixels are turned on to supply data voltages from the data lines to liquid crystal cells.

The liquid crystal cells may be formed between the pixel electrodes to which data voltages are supplied from the data lines and the common electrodes to which a common voltage is applied.

Accordingly, in the LCD, when the data voltages are applied to the pixel electrodes, the TFTs of the pixels are turned on. As a result, difference voltages between the data voltages and the common voltage are charged in the liquid crystal cells to thus display an image.

Conversely, if the gate low voltages are supplied from the gate lines, the TFTs are turned off and the data voltages charged in the liquid crystal cells may be maintained during one frame by a storage capacitor.

The polorizer film 130 may be attached to at least one surface of the display area AA of the liquid crystal panel 120.

The light source substrate 140 comprises a flexible printed circuit board on which a light source 142 is mounted. The right source 142 using a power supplied from an external substrate.

The light guide plate 150 has a patterned shape to uniformly and regularly deliver the light produced by the light source 142 to the display panel 120. The light emitting from the light source 142 is total reflected and/or scattered.

The optical sheets 160 under the light guide plate 150 comprises a plurality of sheets to assist diffusion and/or scattering the light emitting from the light guide plate 150. The optical sheets 160 comprises a diffusion sheet, a prism sheet, a protection sheet and so on.

The black frame 170 is disposed between the optical sheets 160 and the liquid display panel 120 to prevent the light from the light source 142 from being leaked to the non-display area NA of the liquid crystal panel 120 except the exposal area corresponding to the display area AA of the liquid crystal panel 120. The black frame 170 comprises a black-based material to enhance a light shielding characteristic, and it may be formed of single layer or multi layer. The black frame 170 is also referred as a light shielding tape.

The dummy film 180 is disposed between the liquid crystal panel 120 and the black frame 170 to prevent a space from being formed between the black frame 170 and liquid crystal panel 120. In general, there is a space between the black frame 170 and liquid crystal panel 120 because the polorizer film 130 is attached to one surface of the liquid crystal panel 120 facing the black frame 170, or a top of the optical sheets 160 contacting with the black frame 170 coincide with a top of the light source substrate 140.

If there is a space between the liquid crystal panel 120 and black frame 170, the black frame 170 has come off itself by high temperature/humidity circumstance or weakness of adhesive strength and etc. In addition, this space may cause the adhesive force between the light source substrate 140 and a plurality of the optical sheets 160 to be weakened. According to the dummy film 180, it is possible to resolve the above problems.

It is preferable that a thickness of dummy film 180 is set to be equal to a thickness of the polorizer film 130. Alternately, it is preferable that the thickness of the dummy film 180 is thicker or less than that of the polorizer film 130 in order to cancel the space due to the difference between the top of the optical sheets 160 and the top of the light source substrate 140.

The dummy film 180 comprises transparent material or opacity material and has a rectangular shape but is not limited thereto. The dummy film 180 is disposed on an area corresponding to the non-display area NA of the liquid crystal panel 120 adjacent to the polorizer film 130.

The first exemplary embodiment of this document describes the dummy film 180 is attached to one surface of the liquid crystal panel 120 facing the black frame 170.

Figure 2:
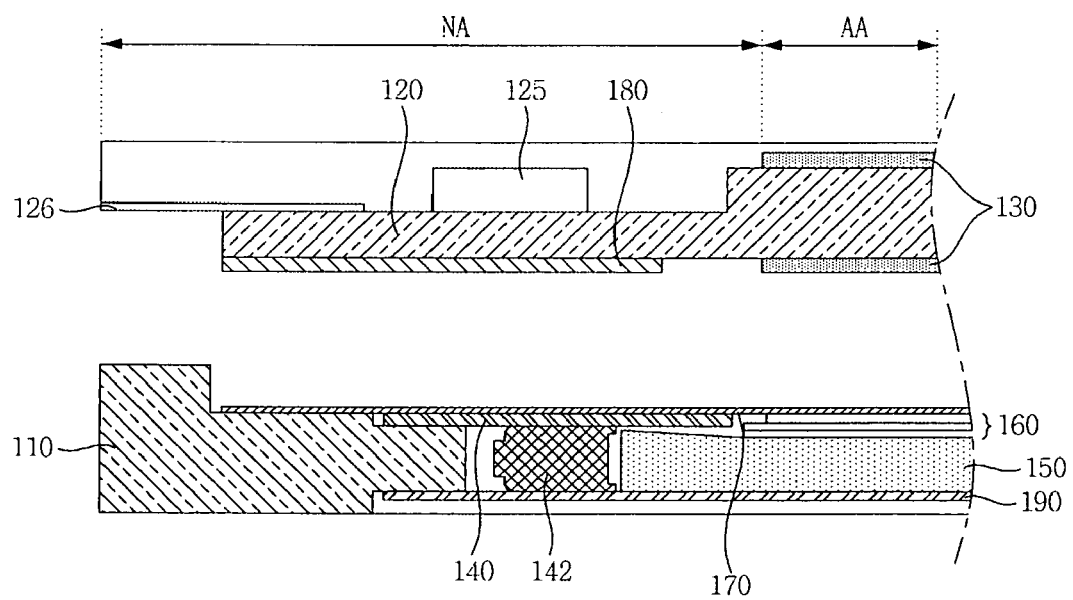
FIG. 2 is sectional views showing a liquid crystal display device in accordance with a first embodiment of this document.
Figure 3:
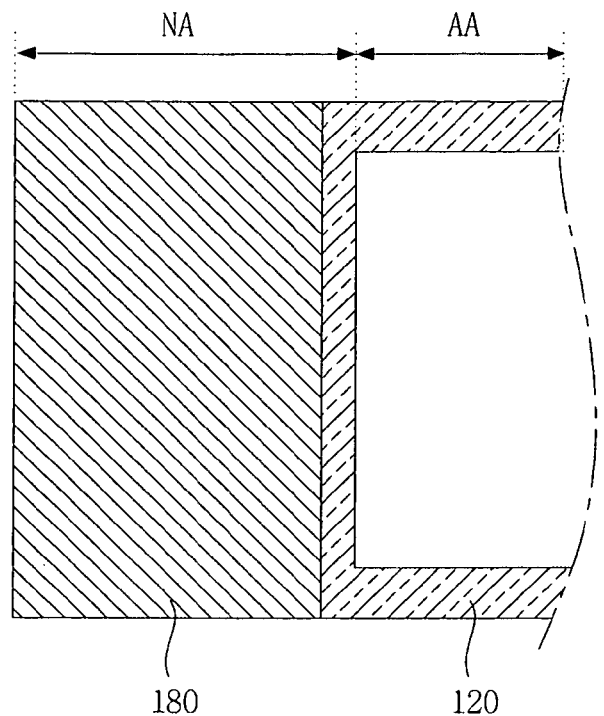
FIG. 3 is plane views showing a part of FIG. 2.

FIG. 2 is view of the liquid crystal panel 120 to be spaced part from the mold frame 110 for showing the dummy film 180 attached to one side of the liquid crystal panel 120.

<Second Embodiment>

Figure 4:
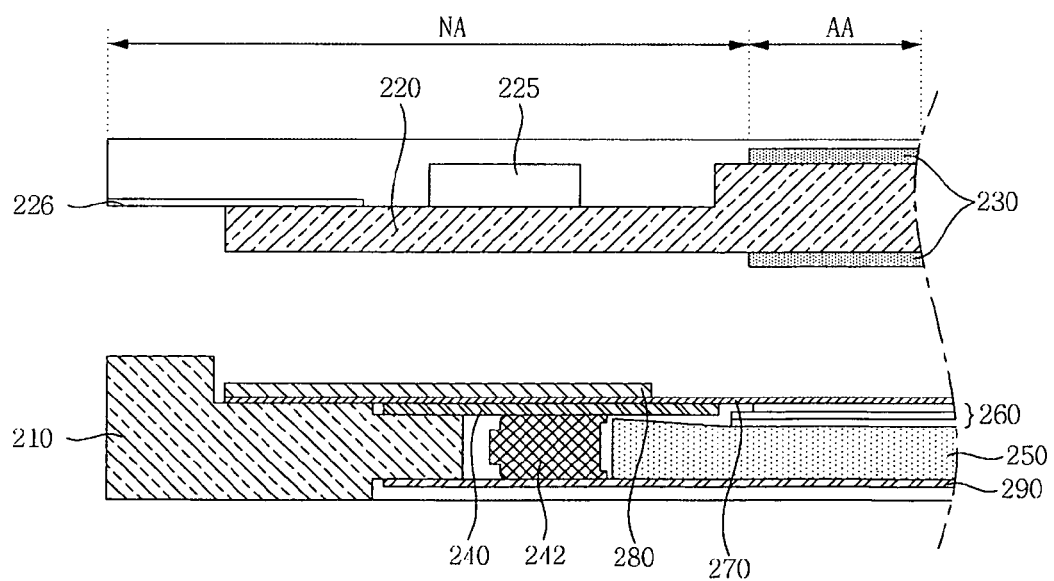
FIG. 4 is sectional views showing a liquid crystal display device in accordance with a second embodiment of this document.
Figure 5:
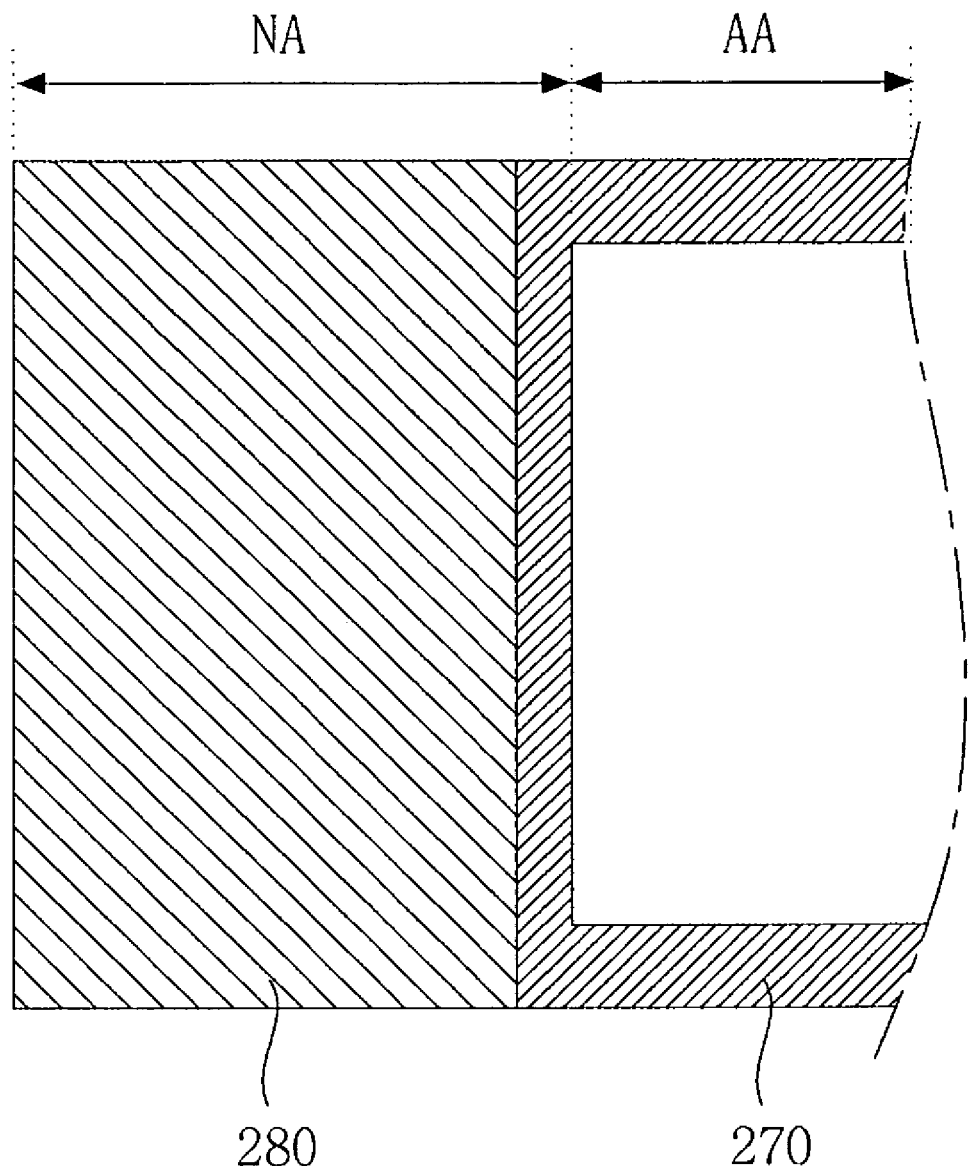
FIG. 5 is plane views showing a part of FIG. 4.

As shown in FIG. 4 and FIG. 5, a liquid crystal display device according to a second exemplary embodiment of this document comprises a mold frame 210, a liquid crystal panel 220 supported by the mold frame 210 and having a display area AA and non-display area NA, a polorizer film 230 disposed at least one surface of the liquid crystal panel 220, a light source substrate 240 supported by the mold frame 210 and having a light source 242, a light guide plate 250 delivering light produced by the light source 242 to the liquid crystal panel 220, a plurality of optical sheets 260 disposed on the light guide plate 250, a black frame 270 disposed between the optical sheets 260 and the liquid crystal panel 220 and having an exposal area corresponding to the display area AA of the liquid crystal panel 220, a dummy film 280 disposed between the liquid crystal panel 220 and the black frame 270, and a reflection sheet 290 disposed under the light guide plate 150.

The dummy film 280 is disposed between the liquid crystal panel 220 and the black frame 270 to prevent a space from being formed between the black frame 270 and liquid crystal panel 220. In general, there is a space between the black frame 270 and liquid crystal panel 220 because the polorizer film 230 is attached to one surface of the liquid crystal panel 220 facing the black frame 270, or a top of the optical sheets 260 contacting with the black frame 270 is not coincide with a top of the light source substrate 240.

If there is a space between the liquid crystal panel 220 and black frame 270, the black frame 270 has come off itself by high temperature/humidity circumstance or weakness of adhesive force and etc. In addition, this space may cause the adhesive force between the light source substrate 240 and a plurality of the optical sheets 260 to be weakened. According to the dummy film 280, it is possible to resolve the above problems.

It is preferable that a thickness of dummy film 280 is equal to a thickness of the polorizer film 230. Alternately, it is preferable that the thickness of the dummy film 280 is thicker or less than that of the polorizer film 230 in order to cancel the space due to the difference between the top of the optical sheets 260 and the top of the light source substrate 240.

The dummy film 280 comprises transparent material or opacity material and has a rectangular shape but is not limited thereto. The dummy film 280 is disposed on an area corresponding to the non-display area NA of the liquid crystal panel 220 adjacent to the polarizer film 230.

According to the second exemplary embodiment of this application, the dummy film 280 is attached to one surface of the black frame 270 facing the liquid crystal panel 220.

The dummy film 280 is cohered with surface of the black frame 270. Accordingly, the black frame 270 having a first thickness part corresponding to the non-display area NA of the liquid crystal panel 220 and a second thickness part corresponding to the display area AA of the liquid crystal panel 220. Here, the first thickness part is thicker than the second thickness part. In this case, it is possible to omit an additional process to attach the dummy film 280 to the black frame 270. Therefore, it will be able to improve a process simplification and productivity.

<Third Embodiment>

Figure 6:
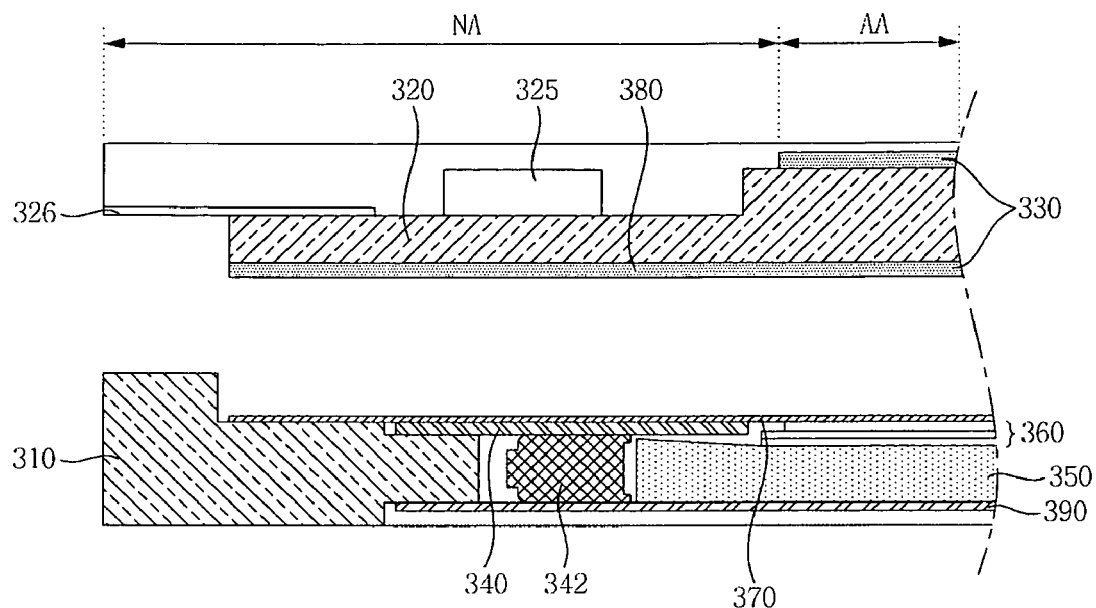
FIG. 6 is sectional views showing a liquid crystal display device in accordance with a third embodiment of this document.
Figure 7:
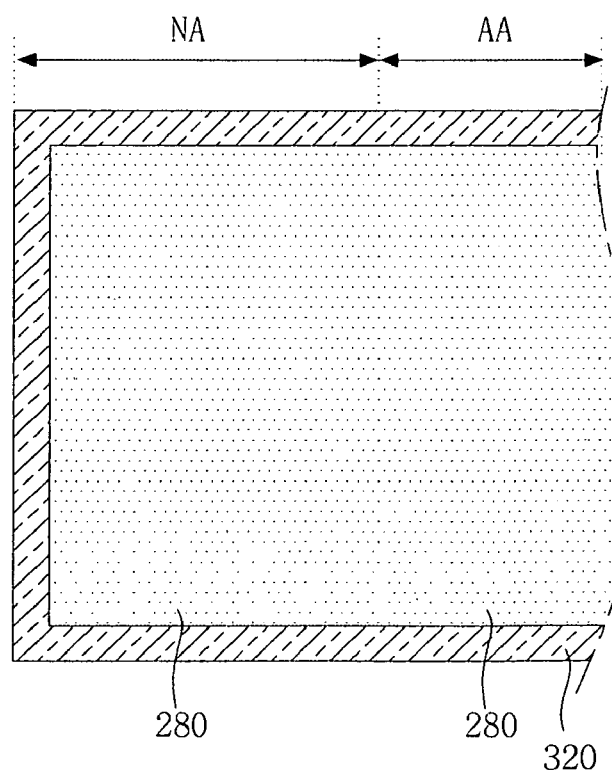
FIG. 7 is plane views showing a part of FIG. 6.

As shown in FIG. 6 and FIG. 7, a liquid crystal display device according to a third exemplary embodiment of this document may comprise a mold frame 310, a liquid crystal panel 320 supported by the mold frame 310 and having a display area AA and non-display area NA, a polarizer film 330 disposed at least one surface of the liquid crystal panel 320, a light source substrate 340 supported by the mold frame 310 and having a light source 342, a light guide plate 350 delivering light produced by the light source 342 to the liquid crystal panel 320, a plurality of optical sheets 360 disposed on the light guide plate 350, a black frame 370 disposed between the optical sheets 360 and the liquid crystal panel 320 and having an exposal area corresponding to the display area AA of the liquid crystal panel 320, a dummy film 380 disposed between the liquid crystal panel 320 and the black frame 370, and a reflection sheet 390 disposed under the light guide plate 350.

In general, there is a space between the black frame 370 and liquid crystal panel 320 because the polarizer film 330 is attached to one surface of the liquid crystal panel 320 facing the black frame 370, or a top of the optical sheets 360 contacting with the black frame 370 is not coincide with a top of the light source substrate 340.

If there is a space between the liquid crystal panel 320 and black frame 370, the black frame 370 has come off itself by high temperature/humidity circumstance or weakness of adhesive strength and etc. In addition, this space may cause the adhesive force between the light source substrate 340 and a plurality of the optical sheets 360 to be weakened. According to the dummy film 380, it is possible to resolve the above problems.

To solve the above problems, the polarizer film 330 may extend from the display area AA to non-display area NA of the liquid crystal panel 320. In this case, the polarizer film 330 serves as the dummy film 380 in the non-display area NA.

Therefore, the dummy film 380 extended from the polarizer film 330 prevents a space from being formed between the black frame 370 and liquid crystal panel 320. And it formed same material with the polarizer film 330.

As described above, the liquid crystal display device according to this application can provide a liquid crystal display device which effectively minimizes a space formed between the liquid crystal panel and the light source substrate. And this application can provide an improvement of the display quality and reliability.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A liquid crystal display device comprising:
a mold frame;
a liquid crystal panel supported by the mold frame and having a display area and non-display area;
a polarizer film disposed at least one surface of the liquid crystal panel;
a light source substrate supported by the mold frame and having a light source;
a light guide plate delivering light produced by the light source to the liquid crystal panel;
a plurality of optical sheets disposed on the light guide plate;
a black frame disposed between the optical sheets and the liquid crystal panel and having an exposal area corresponding to the display area of the liquid crystal panel; and
a dummy film disposed between the liquid crystal panel and the black frame,
wherein the black frame has a rectangular shape which corresponds to the liquid crystal panel,
wherein the dummy film is disposed on an area corresponding to the non-display area and is attached to the black frame,
wherein the dummy film is disposed opposite to a driving unit for supplying a data signal, and
wherein the dummy film is a separate element from the polarizer film and disposed as a spacer between the black frame and the liquid crystal panel,
wherein a thickness of the dummy film is substantially equal to a thickness of the polarizer film to prevent a space from being formed between the black frame and liquid crystal panel,
wherein a material of the dummy film is the same as a material of the polarizer film.

2. A liquid crystal display device according to claim 1, wherein the dummy film comprises transparent material or opacity material.

3. A liquid crystal display device according to claim 1, wherein the dummy film has a rectangular shape.

4. A liquid crystal display device according to claim 1, wherein the dummy film is attached to the liquid crystal panel.

5. A liquid crystal display device according to claim 1, wherein the dummy film is extended from the polarizer film.

6. A liquid crystal display device comprising:
a mold frame;
a liquid crystal panel supported by the mold frame and having a display area and non-display area;
a polarizer film disposed at least one surface of the liquid crystal panel;
a light source substrate supported by the mold frame and having a light source;
a light guide plate delivering light produced by the light source to the liquid crystal panel;
a plurality of optical sheets disposed on the light guide plate; and
a black frame disposed between the optical sheets and the liquid crystal panel, and having an exposal area corresponding to the display area of the liquid crystal panel, wherein the black frame having a first thickness part corresponding to the non-display area of the liquid crystal panel and a second thickness part corresponding to the display area of the liquid crystal panel, and wherein the first thickness part is thicker than the second thickness part, wherein the black frame has a rectangular shape which corresponds to the liquid crystal panel, wherein the first thickness part of the black frame includes a dummy film, the dummy film is cohered with an extended surface of the black frame, wherein the dummy film is disposed opposite to a driving unit for supplying a data signal, and wherein the dummy film is separate element from the polarizer film and disposed as a spacer between the black frame and liquid crystal panel, wherein a thickness of the dummy film is substantially equal to a thickness of the polarizer film to prevent a space from being formed between the black frame and liquid crystal panel, wherein a material of the dummy film is the same as a material of the polarizer film.

7. A liquid crystal display device according to claim 6, wherein the dummy film comprises transparent material or opacity material.

8. A liquid crystal display device according to claim 6, wherein the dummy film has a rectangular shape.

* * * * *